United States Patent
Buchholz et al.

(10) Patent No.: US 10,687,654 B2
(45) Date of Patent: Jun. 23, 2020

(54) METHOD FOR OPERATING A SINGLE AUTOMATIC BEVERAGE DISPENSER FROM AMONG A PLURALITY OF BEVERAGE DISPENSERS

(71) Applicant: MELITTA PROFESSIONAL COFFEE SOLUTIONS GMBH & CO. KG, Minden (DE)

(72) Inventors: Bernd Buchholz, Rahden (DE); Jürgen Nagel, Hüllhorst (DE)

(73) Assignee: MELITTA PROFESSIONAL COFFEE SOLUTIONS GMBH & CO. KG, Minden (DE)

( * ) Notice: Subject to any disclaimer, the term of this patent is extended or adjusted under 35 U.S.C. 154(b) by 179 days.

(21) Appl. No.: 15/665,379

(22) Filed: Jul. 31, 2017

(65) Prior Publication Data

US 2018/0035839 A1 Feb. 8, 2018

(30) Foreign Application Priority Data

Aug. 3, 2016 (DE) .................. 10 2016 114 351
Jul. 21, 2017 (DE) .................. 10 2017 116 485

(51) Int. Cl.
*A47J 31/40* (2006.01)
*A47J 31/42* (2006.01)
(Continued)

(52) U.S. Cl.
CPC .............. *A47J 31/40* (2013.01); *A47J 31/42* (2013.01); *A47J 31/4496* (2013.01); *A47J 31/52* (2013.01); *G06Q 20/327* (2013.01); *G07F 13/065* (2013.01)

(58) Field of Classification Search
CPC . B67D 2210/00089; A47J 31/40; A47J 31/42; A47J 31/4496; A47J 31/52; G06Q 20/327; G07F 13/065
(Continued)

(56) References Cited

U.S. PATENT DOCUMENTS

2012/0285986 A1    11/2012  Irvin
2015/0143116 A1*   5/2015   Tang .................. G06Q 20/3278
                                                 713/168

(Continued)

FOREIGN PATENT DOCUMENTS

DE    10 2010 017 221 A1    12/2011
DE    10 2012 109 982 A1     4/2014
EP           2279683 A1      2/2011

OTHER PUBLICATIONS

Translation of DE102012109982 Apr. 2014.*
Search Report for European Patent Application No. 17182519 dated Dec. 11, 2017.

*Primary Examiner* — Lee Nguyen
(74) *Attorney, Agent, or Firm* — FisherBroyles, LLP; Robert Kinberg

(57) ABSTRACT

A method for operating an automatic beverage dispenser, such as a coffee machine provided with a control panel by using a mobile device with a communication unit. A communication link is automatically established between the beverage dispenser and the mobile device. A data set representing a user personalized recipe is transmitted from the mobile device to the coffee machine which temporarily stores the dataset. The personalized recipe is displayed as a selection option on the control panel of the beverage dispenser. Preparation of the beverage is triggered by selecting the desired personalized recipe in response to which a personalized beverage is dispensed by the beverage dispenser.

16 Claims, 6 Drawing Sheets

(51) Int. Cl.
*A47J 31/52* (2006.01)
*G07F 13/06* (2006.01)
*G06Q 20/32* (2012.01)
*A47J 31/44* (2006.01)

(58) Field of Classification Search
USPC ........................................................ 455/41.2
See application file for complete search history.

(56) References Cited

U.S. PATENT DOCUMENTS

2017/0172340 A1\* 6/2017 Baarman ................. A47J 31/52
2018/0288594 A1\* 10/2018 Kim ...................... H04W 76/14

\* cited by examiner

METHOD FOR OPERATING A SINGLE AUTOMATIC BEVERAGE DISPENSER FROM AMONG A PLURALITY OF BEVERAGE DISPENSERS

CROSS-REFERENCE TO RELATED APPLICATIONS

This application claims priority to German Application No. 10 2016 114 351.0, filed Aug. 3, 2016, and German Application No. 10 2017 116 485.5, filed Jul. 21, 2017, the disclosures of which are incorporated by reference in their entirety.

BACKGROUND OF THE INVENTION

The present invention relates to a method for operating a single automatic beverage dispenser from among a plurality of beverage dispensers.

The method according to the invention involves operation of the automatic beverage dispenser, in particular a machine for dispensing hot beverages and, preferably a fully automatic coffee machine, from among a plurality of beverage dispenser, which can dispense both hot or cold beverages. These beverages include different specialty coffee and milk products. It is desirable to offer the dispensing beverages with personalized (specially prepared) recipes to the user. A personalized recipe is based on personalized settings. For example, this relates to a setting/change in the originally weighed-in quantity, and/or a setting/change in the brewing temperature, and/or a setting/change in the grinding fineness, and/or a setting/change in the ratio of milk foam to coffee in the case of a coffee/milk beverage. With respect to this, reference is made to German patent document DE 10 2010 017 221 A1 of the present Applicant.

German patent document DE 10 2012 109 982 A1 discloses a household device controlled via mobile telephone. According to one operating variant, the household device can be operated by several users. In that case, a user identification is triggered when the mobile telephone approaches the household device, and a user profile is called up which is stored in the data store of the household device. This variant is suitable for a single household device which is used only by a limited number of users. According to a different operating variant, data stored on the mobile telephone are transmitted to the household device to trigger actions therein. A disadvantage is that with a larger number of clients, for example in a restaurant chain, a large number of user profiles would have to be stored in in the household device. As a result, it no longer makes sense to use these household devices, for example in a restaurant chain where respectively one or a plurality of automatic beverage dispensers of a manufacturer and/or of the same type are present.

SUMMARY OF THE INVENTION

Starting with the above mentioned prior art, it is an object of the present invention to make it easy to dispense even to a larger number of users a beverage prepared based on a personalized recipe, so that the method is suitable for operating an automatic beverage dispenser from among a plurality of automatic beverage dispensers.

The above and other objects are achieved according to the invention by the provision of a method for operating a single automatic beverage dispenser, from among a plurality of automatic beverage dispensers, that dispenses at least one of hot and cold beverages by using a mobile device also having a corresponding communication unit, each of the automatic beverage dispensers having respectively one control panel and respectively one communication unit for operation, wherein each of the automatic beverage dispensers is adapted to establish communication links with a plurality of mobile devices, the method comprising steps of:

a) making available a respective dataset including at least one recipe personalized for a respective user for at least one of hot and cold beverages on the respective mobile device;

b) automatically establishing a communication link between the single automatic beverage dispenser and one of the mobile devices when a user with the one mobile device approaches the single automatic beverage dispenser;

c) transmitting the dataset for the at least one user personalized recipe for the at least one hot and cold beverage from the one mobile device to the single automatic beverage dispenser;

d) temporarily storing of the dataset in a data store belonging to the single automatic beverage dispenser;

e) displaying the at least one user personalized recipe as at least one selection option, respectively, on the control panel of the single automatic beverage dispenser;

f) triggering a preparation sequence on the single automatic beverage dispenser of the hot or cold beverage by selecting one of the user personalized recipes on the control panel;

g) preparing and dispensing a personalized beverage from the single automatic beverage dispenser based on the selected one of the user personalized recipes;

h) deleting or overwriting the temporarily stored dataset from the data store of the single automatic beverage dispenser following a severing the communication link between the single automatic beverage dispenser and the one mobile devices.

The beverage dispenser is provided with a control panel where the user himself or, for example in a restaurant, the operating personnel can select an ordered beverage. The term control panel should not be understood too narrowly. It can refer to a touchscreen, offering optical displays of the personalized recipes, as well as operator inputs or a combination of one or several displays and separate input means such as buttons on a keyboard.

The beverage dispenser can be used as a dispensing device on location in department stores, restaurants and restaurant chains, for example, or also in cafeterias or the like.

A mobile device can be used, but need not exclusively be used, for operating the beverage dispenser. To be sure, this is particularly advantageous because it allows the easy transmitting of recipes. However, the dispensing requires confirmation at the machine, which is useful and makes sense to ensure that each time only the recipe to be prepared for a client is released purposely, e.g. by an employee at the restaurant.

The mobile device comprises a communication unit, meaning a communication module, preferably in the form of a wireless data transmitting module, in this case referred to as radio module. Modules of this type, e.g. Bluetooth radio modules, nowadays generally come standard in cell phones, tablets and the like and function to set up communication links with another device, which for the present case is the fully automatic coffee machine provided with a corresponding communication unit.

The steps a) to h) are explained once more in further detail in the following:

In step a), one or several recipe(s) personalized for the user is/are made available in the form of a dataset on the mobile device, for a hot or cold beverage and in particular for a hot beverage. A personalized recipe, in turn, is based on personalized settings. For example, a setting/change in the setting relates to the weighed-in amount, and/or the brewing temperature, and/or the degree of grinding fineness, and/or the ratio of milk foam to coffee for a coffee/milk mixed beverage. In this way, the user can also store and/or individually adapt one or several personalized recipe(s) on his/her personalized device, even without a communication link to the beverage dispenser.

In step b), a communication link is automatically established between the beverage dispenser and the mobile device. The communication link preferably can be established over a short range of less than 20 m. For example, Bluetooth connections in Class 2 or also Bluetooth LE (low energy) connections have a maximum range of approximately 8 m-12 m.

The method steps a) and b) can be exchanged timewise. Theoretically it is therefore possible for the mobile device to first establish a communication link with the beverage dispenser and for the user to then create a personalized recipe.

The dataset of the personalized recipe or the several personalized recipes for a hot or cold beverage is then transmitted in step c) to the fully automatic coffee machine. In the case of a self-serve beverage dispenser, the user can select from among favorite recipes or, while in a restaurant, can provide service personnel with the name of the favorite recipe.

In step d), the dataset is stored temporarily in a memory of the fully automatic coffee machine, wherein the storage time for the dataset in the memory can vary. For example, the dataset can be overwritten upon receiving a different dataset. In contrast to the use of household devices, the goal of the present invention is not to use the mobile device exclusively as an expanded user display for a fully automatic coffee machine. Fully automatic coffee machines used in restaurant chains or cafeterias, on the other hand, are generally not connected to the Internet. For the present invention, the recipes are created in the mobile device, stored in the mobile device and sent only temporarily to the beverage dispenser. As a result, the expenditure for the data administration is reduced decisively and data from the respective user are deleted after severing the communication link—e.g. following the dispensing of the beverage. This is an advantage since the individual beverage machines are thus not overloaded with data and it can be ensured that no user information or information on the individual user remains in the beverage machine.

In a step e), the personalized recipe(s) is/are displayed for the optional selection on the control panel of the beverage dispenser, which permits a particularly simple menu administration based on the selection of the client and the selection of the desired recipe. Of course, a standard menu is also available with recipes stored in the beverage dispenser.

In a step f), the preparation is triggered on the beverage dispenser by selecting the personalized recipe or one of the personalized recipes. On a self-service machine, the user can trigger the selection while, otherwise, service personnel can do so.

In step g), the personalized beverage and/or the beverage prepared based on the personalized recipe is dispensed.

In a step h), the data of the respective user are deleted following a severing of the communication link, for example after dispensing the beverage.

It is advantageous if the temporarily stored dataset is erased from or overwritten in the memory of the beverage dispenser following the steps f) or g). The data can be erased following a fixed time interval, e.g. after two minutes. Alternatively, the dataset can also be overwritten, for example, by a following dataset. However, several datasets with personalized recipes from different mobile devices can also be temporarily kept available, so that the beverage dispenser can process an order list during a simultaneous communication link with several users.

It is advantageous if a near or close-range communication link, especially a near-field connection (NFC), or a Bluetooth connection, is used for automatically establishing a communication link between the beverage dispenser and the mobile device. This avoids unintended communication links to a plurality of users in the area surrounding the beverage dispenser, which may not be interested in a beverage.

The beverage dispenser is advantageously embodied for the simultaneous setting up of communication links with several mobile devices.

The choices can be made available according to step a) by providing a selection menu on the mobile device, based on the type of beverage and, following the beverage selection, by releasing an input menu in which a personalized recipe can be selected and created, again based on personalized settings. For example, this relates to a setting/change of the weighed-in amount and/or the brewing temperature, and/or the degree of grinding fineness, and/or the ratio of milk foam to coffee for a milk/coffee mixed beverage.

The selection menu and the setup menu are components of an application, a so-called App, stored in the mobile device.

The type of beverage that can be selected can comprise at least the following beverages: cold and hot cappuccino, espresso, latte macchiato, coffee, mocha and/or other beverages.

A recipe is preferably stored on the mobile device only following a manual activation of a storage by triggering a field in the selection menu of the mobile device. A non-automatic storage thus takes place, so that only recipes are stored which the user really wants to keep for the future.

Following the establishing of a communication link in step f), a selection field can be activated to display the recipe and mode of operation of the automatic beverage dispenser, wherein the personalized recipe or recipes are displayed through manual activation of this field. This selection field either directly activates the personalized menu with the different favorite beverages, or it activates a menu relating to the selection of the registered user. If the selection field is not activated, only the recipes for standard beverages can be called up which are stored in the memory of the beverage dispenser.

It is advantageous if the beverage dispenser displays several personalized selection fields once the communication link with several mobile devices has been established, wherein the personalized recipe or recipes stored in a single mobile device are called up via manual activation of one of these fields.

The selection field can be stored with a safety code for the request, wherein the respective mobile device transmits the safety code jointly with the dataset, thus preventing that an unauthorized third person has access to the personalized menu of another user.

In addition to transmitting the dataset of the personalized recipe, the mobile device can advantageously also transmit a dataset relating to the credit balance to the fully automatic coffee machine. This credit can be linked in the form of a credit code within the framework of a payment system to other providers, for example other vendors and can be transmitted via the Internet to the mobile device. This code is preferably transmitted automatically to the beverage dispenser, and the price is computed based on a credit voucher code by a control and computing unit, for example a processor, of the beverage dispenser.

The mobile device can receive data for the beverage dispenser which are transmitted by the mobile device via an Internet connection to the manufacturer of the fully automatic coffee machine, the supplier of ingredients for the hot beverage, and/or the owner of the fully automatic coffee machine. In this way, the manufacturer can be informed, for example, about a device defect or the supplier can be informed of a request from the beverage dispenser, e.g. filling in of coffee grounds or the like.

The beverage dispenser can transmit a dataset to the mobile device for the identification of the fully automatic coffee machine from among a plurality of beverage dispensers. Insofar as a communication link has been established with a beverage dispenser, no communication link to additional beverage dispensers can be established according to one embodiment. The beverage dispenser connected by communication link then sends a signal to a mobile device with the information on which beverage dispenser can be utilized for serving the user or service personnel. As a result, waiting times at the beverage dispenser are reduced, e.g. in large cafeterias or restaurants.

The beverage dispenser can display a location signal or transmit this signal to the mobile device, which allows the user to identify the beverage dispenser from among a plurality of beverage dispensers.

BRIEF DESCRIPTION OF THE DRAWINGS

The subject matter of the invention is explained in further detail in the following with the aid of exemplary embodiments and with reference to the drawings, showing in.

DETAILED DESCRIPTION OF THE INVENTION

Figure 1:
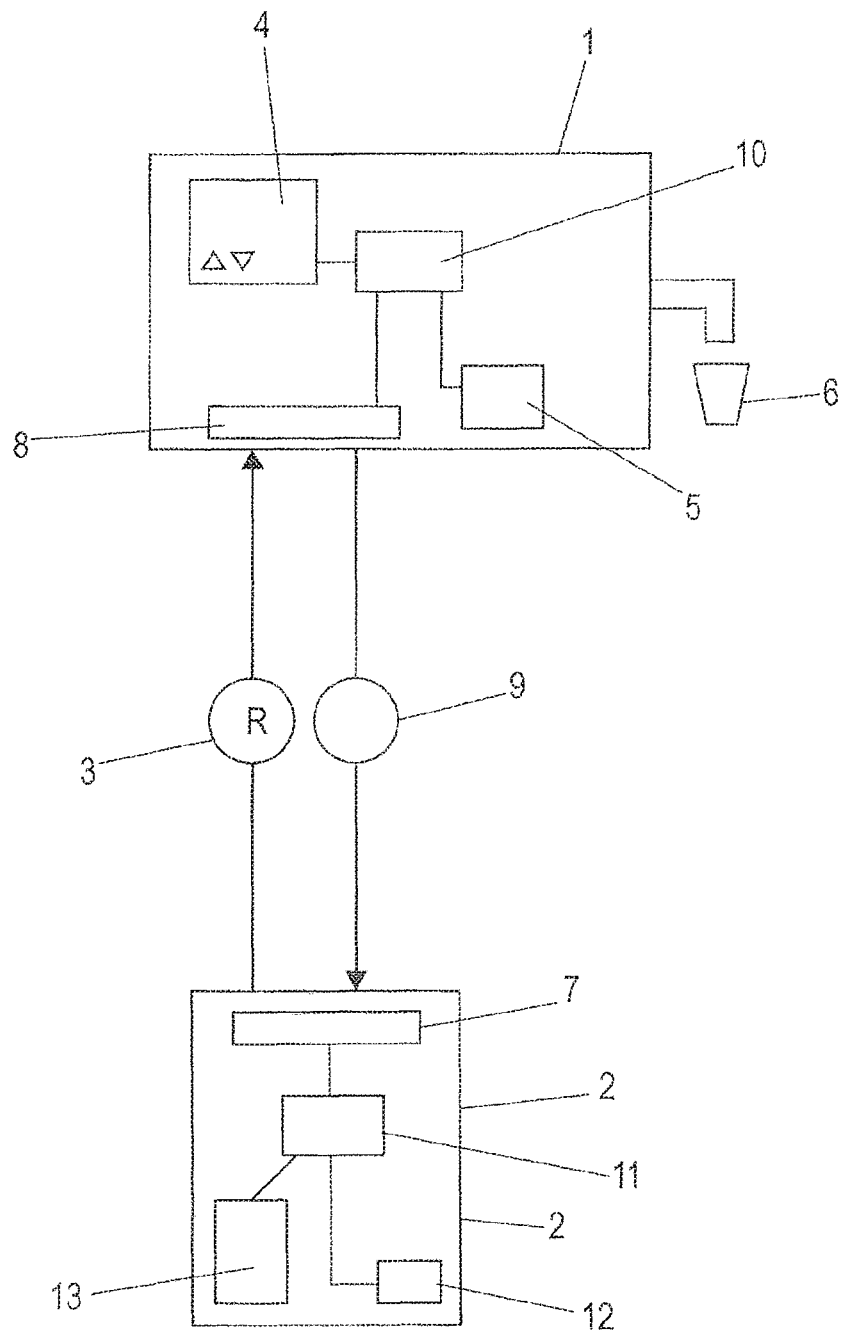
FIG. 1 A schematic representation of one embodiment of the inventive method.

Referring to FIG. 1, there is shown a fully automatic coffee machine 1 with control panel 4. The fully automatic coffee machine is furthermore provided with modules for preparing and dispensing coffee and/or milk beverages based on preset or personalized recipes.

This refers to a single automatic coffee machine among many automatic coffee machines, wherein the many coffee makers can be distributed, for example, among a corresponding number of restaurants of a restaurant chain or several cafeterias or the like.

A mobile device 2 is furthermore provided for the transmitting of personalized recipes.

An advantageous method for operating an individual beverage dispenser, from among a plurality of beverage dispensers, in particular a hot beverage dispensers preferably a fully automatic coffee machine 1, respectively provided with a display 4 having a communication unit 8 for communicating with a mobile device 2, provided with a communication unit 7, characterized by the following operating steps:

a) Making available one or several recipe(s) R, personalized for a user, for a hot or cold beverage, in particular for a hot beverage, in the form of a dataset 3 on the respective mobile device 2;

b) Automatic establishment of a communication link between one of the beverage dispensers 1—upon approach to the respective beverage dispenser 1—and the respective mobile devise 2;

c) Transmitting to the beverage dispenser 1 the dataset 3 for the one personalized recipe R or the several personalized recipes for the hot beverage or cold beverage;

d) Temporary storage of the dataset 3 on the data store 5 of the beverage dispenser 1;

e) Displaying of the personalized recipe or recipes R as a selection option on the control panel 4 of the beverage dispenser 1;

f) Triggering the steps for preparation on the beverage dispenser 1 by selecting and confirming the single personalized recipe R or one of the personalized recipes;

g) Preparing and dispensing of the personalized beverage 6; and h) Deleting or overwriting the temporarily stored dataset from the data store of the single automatic beverage dispenser following a severing the communication link between the single automatic beverage dispenser and the one mobile device, for example after dispensing the beverage.

The fully automatic coffee machine 1 and the mobile device 2 respectively comprise a communication unit 7, 8 for the near range which units connect to each other as soon as the mobile device 2 is close enough to the fully automatic coffee machine 1 so that the communication unit 7 for the mobile device and the communication unit 8 in the fully automatic coffee machine are located in a mutual detection range.

Once this distance between the mobile device 2 and the fully automatic coffee machine 1 is reached, a communication link is established and at least one dataset is transmitted to the fully automatic coffee machine 1.

The fully automatic coffee machine 1 then carries out a number of steps corresponding to the received data.

The control and computing unit 10, in particular a processor, typically realizes the data administration of the fully automatic coffee machine 1 and calculates the price.

In the same way, the mobile device 2 is also provided with a control and computing unit 11, e.g. a processor, and a memory 12, wherein these elements can also form a single structural unit. A display 13 on the on the mobile device 2 for displaying menus for an App is shown only schematically in FIG. 1.

The data and/or the dataset are stored only temporarily. With restaurant chains or in large cafeterias, a high number of clients/users should be assumed, some of whom visit a location only once. Storing all user profiles in all fully automatic coffee machines would therefore not make sense.

Immediately after setting up the communication link, all datasets for the personalized recipes of the respective user can be transmitted to the fully automatic coffee machine 1.

Alternatively, the mobile device 2 can also transmit initially only one dataset to the fully automatic coffee machine, which contains a template relating to the various recipes, wherein each recipe is provided with a code. When selecting a beverage, the code is transmitted to the mobile device 2 for the fully automatic coffee machine, and the concrete personalized recipe, in turn, is transmitted by the mobile device 2 to the fully automatic coffee machine.

The data for the personalized recipes are generated in the mobile device 2, for example by running a computer program thereon, which nowadays is generally called an application or App. Selecting one or several functions can take place on user surfaces of the mobile device, for example by selecting a type of beverage such as coffee, cappuccino, espresso and the like.

The selection of the type of beverage and the input of the beverage can be done individually, without the mobile device 2 already communicating with the fully automatic coffee machine 1. However, the selection of one or several functions of the fully automatic coffee machine can also be done through a temperature setting for individual beverage ingredients for the hot beverage, and/or by specifying the amount of ingredients, or a mixing ratio for such ingredients. By specifying these data, one or several functions of the fully automatic coffee machine can be selected, for example a metering function, and/or a heating function. These functions are preferably input only when transmitting the desired recipe to the fully automatic coffee machine.

The transmitted data can also contain datasets for several recipes which are transmitted by a mobile device to the fully automatic coffee machine. The data entered, for example, by a user to specify a personal profile for a single or several beverage(s), are then available at the fully automatic coffee machine itself, so that the operator can call up hot beverages at the fully automatic coffee machine, based on the respective personal profile. The operator of the fully automatic coffee machine can be a server in a restaurant. In the case of a self-serve machine, the user can also be the owner of the mobile device.

Following the dispensing of the hot beverage, the dataset for the personalized recipe and/or recipes is deleted, and/or is stored only for a short time. In the case of many clients, e.g. for a restaurant chain, the personalized recipes no longer needed are deleted in the memory of the respective fully automatic coffee machine.

The mobile device 2 and the fully automatic coffee machine 1 preferably exchange data via a Bluetooth connection, advantageously having a transmitting range of at least 3 m to 8 m. This includes Bluetooth Low Energy (BLE), Bluetooth 2.0 as well as smart Bluetooth.

Possible setting options on the mobile device 2 and on the fully automatic coffee machine 1 are explained in further detail in the following, with the aid of FIGS. 2 to 7.

Figure 2:
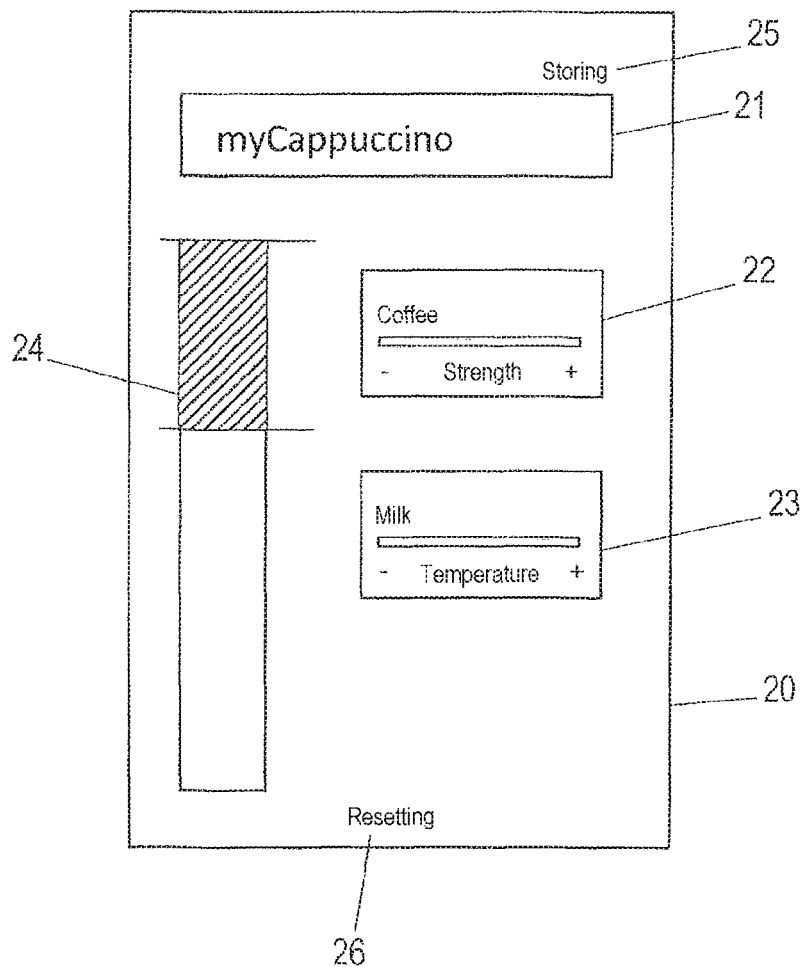
FIG. 2 A menu display on a mobile device for making available a personalized recipe for a first type of beverage.

FIG. 2 shows an example for a user surface or control panel with a setup menu 20 on a mobile telephone, serving as the mobile device.

A "field" is preferably used in the following for the input and/or setting field for entering and/or displaying information.

The setup menu comprises a name field 21 where the user can input a name for the personalized beverage. The setup menu 20 also comprises several ingredient fields 22 and 23. The ingredient field 22 can be activated, for example, to adjust the strength of the coffee (amount of coffee grounds). If the ingredient field 23 is activated, the temperature and quantity of milk and/or milk foam can be selected. A sliding bar 24 can be used to select the quality and/or ratio between the ingredients.

The setup menu 20 furthermore comprises a field 25 for triggering the storage of the input ingredients. Thus, no automatic storage of the input data immediately upon entering the data on the mobile device occurs without confirmation—which would have the disadvantage of an undesirable storage of recipes not intended for storage and/or associated datasets. Data are stored only following a manual triggering of the storage. The setting menu furthermore can comprise a field 26 for resetting the menu to a factory setting. The first setup menu 20 can be provided specifically for a single coffee flavor, such as cappuccino.

Figure 3:
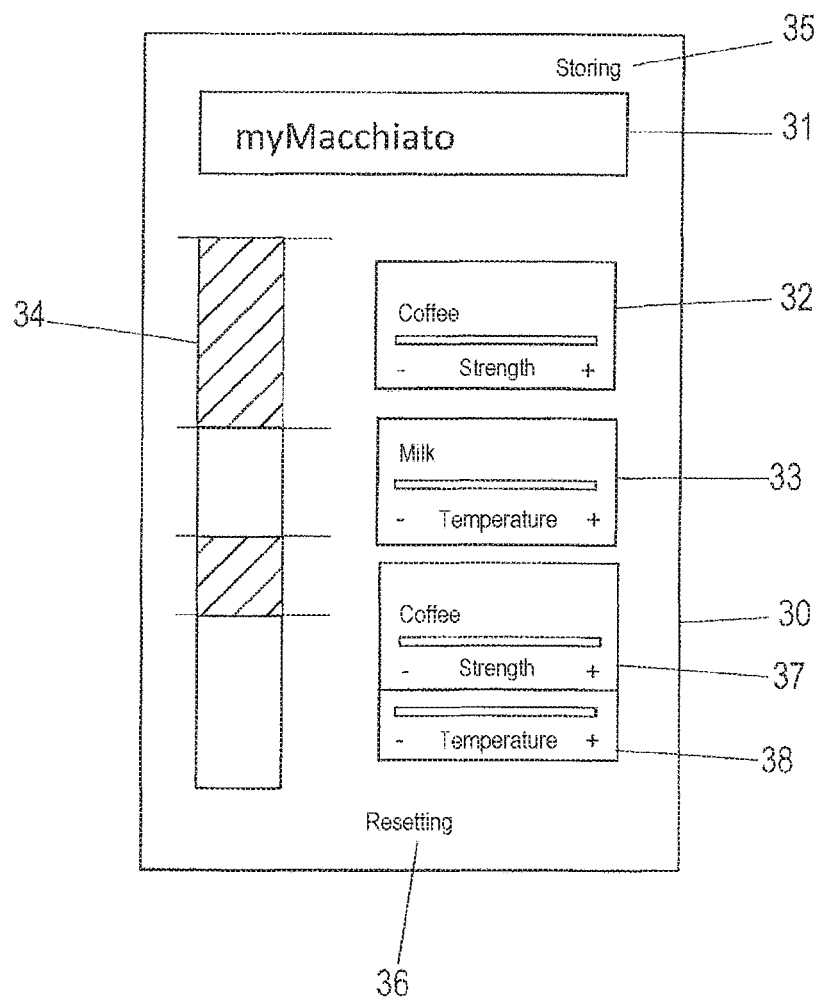
FIG. 3 A menu display on a mobile device for making available a personalized recipe for a second type of beverage.

Corresponding to FIG. 2, FIG. 3 shows a second setup menu 30 with a field 35 for triggering the storage of the entered ingredients, along with a field 36 for resetting to a factory setting. The name field 31 is furthermore intended for entering the designation of the personalized beverage, wherein a macchiato variant is created in this case. Several ingredient fields 32, 33 and 37 are also provided. The ingredient fields 32, 37 are used for adjusting the strength and, if applicable, the quality of two successively dispensed coffee portions. The ingredient field 33 is used for adjusting the temperature of the milk or a milk foam and, if applicable, also the quality of the milk. In addition, the temperature of the added coffee flavor can be adjusted on a field 38.

The quantities of the individual ingredients can be displayed and/or input via the sliding bar 34.

Figure 4:
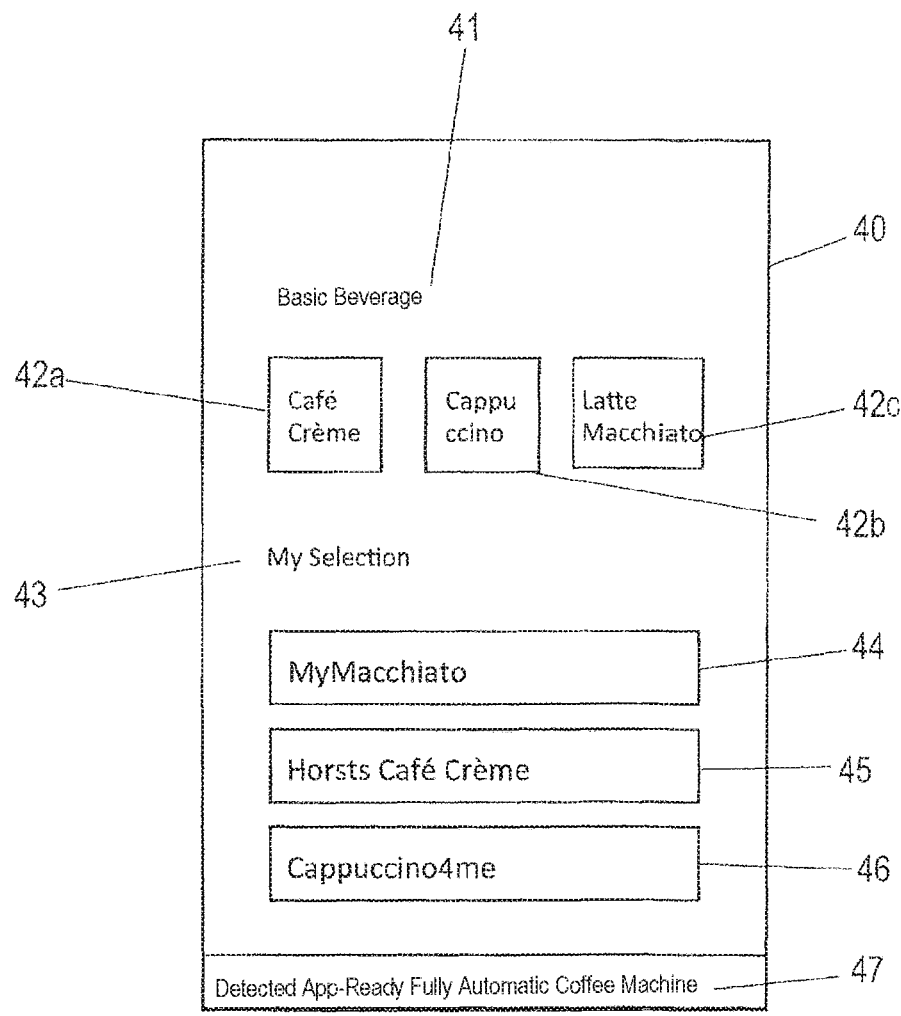
FIG. 4 A menu display on a mobile device for making available a selection menu with several personalized recipes and several basic recipes.
Figure 6:
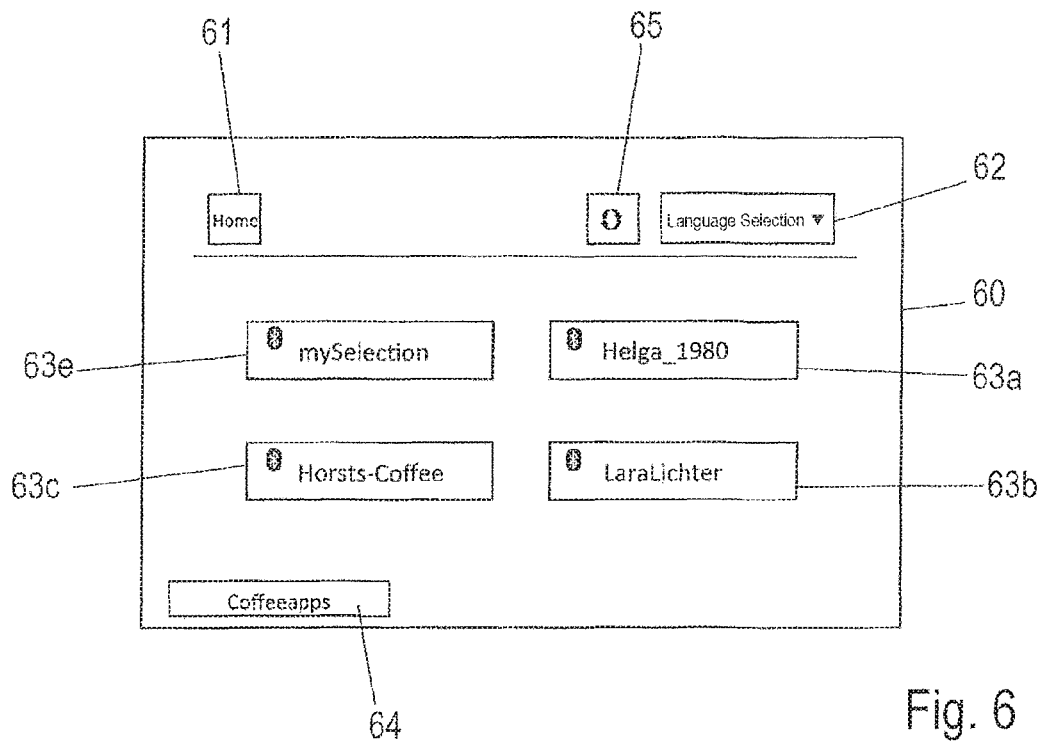
FIG. 6 A menu displaying the individual recipe for a single user from among several users, registered with the beverage dispenser.

FIG. 4 shows the user surface of a selection menu 40 on a mobile telephone used for the mobile device.

The display fields 41 and 43 show one or several previously stored recipes (e.g. coffee, cappuccino and the like, prepared according to previously stored, standard recipes for the machine). The (operating) fields 42*a*, 42*b* and 42*c* are touch-activated and represent so-called beverage types. By selecting one of the beverage types, a pre-selection of ingredients can already be made.

The fields 44, 45 and 46 stand for and/or represent already personalized recipes which can still be changed through activation.

The field 47 is a display field by means of which the mobile device 2 informs the user that a communication link has been established with a fully automatic coffee machine 1.

Figure 5:
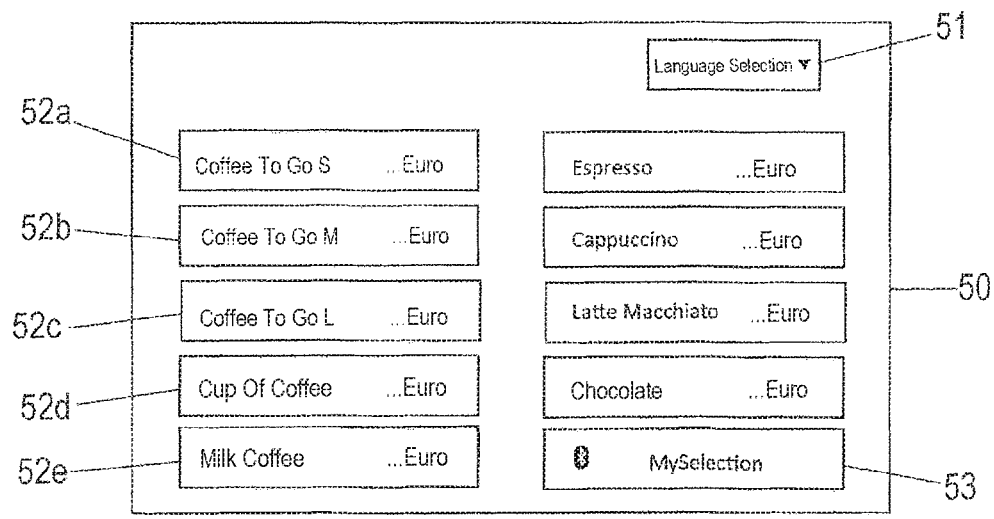
FIG. 5 An control panel display on a beverage dispenser.

FIG. 5 represents a basic menu 50 on the control display 4 of the fully automatic coffee machine 1. Selected thereon can be preset basic recipes, stored in the memory of the fully automatic coffee machine 1, such as "coffee to go" or "milk coffee," wherein by pushing the fields 52*a*-52*e*, the price information for each beverage is also provided.

A selection field 53 called "MySelection" is also provided. The basis menu 50 comprises a field 51 which allows changing the language on the display when it is activated.

When activating this field 53, it is possible to change to a client selection menu 60 if several users are registered for the device. The client selection menu 60 comprises a field 62 through which the language on the display can be changed when it is activated. An additional field 65 is a reload field for reactivating the system. Finally, a field 61 is provided, e.g. named "home," which allows resetting the fully automatic coffee machine to the basic menu 50.

As can be seen in the client selection menu, client fields 63*a*-63*d* are displayed if several clients are registered. When activating the client fields 63*a*-63*d*, a switch takes place to a personalized selection menu 70 for a single user.

With only one user registered on the device, a direct change to the selection menu 70 occurs when the selection field 53 is activated.

This personalized selection menu 60 comprises a field 61, e.g. named "home," which allows resetting the fully automatic coffee machine to the basic menu 50.

Figure 7:
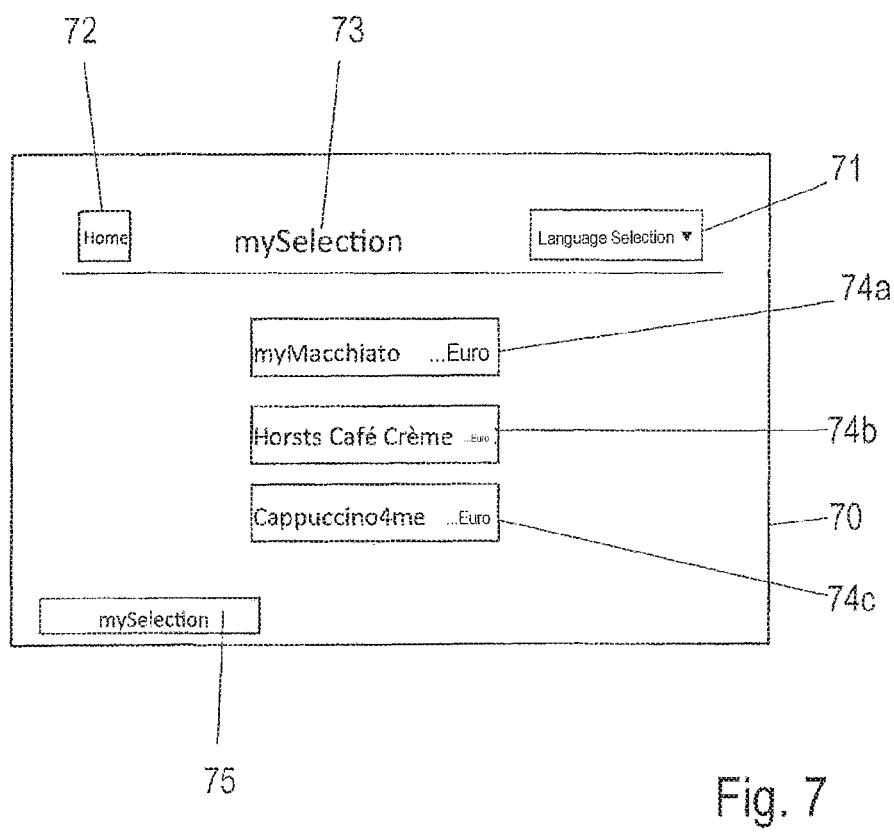
FIG. 7 A menu showing an individual recipe display of a user on the beverage dispenser.

Referring to FIG. 7, the selection menu 70 comprises a field 71 which, when activated, allows changing the language of the display. The menu name 73 can be input freely on the mobile device by the client and is displayed correspondingly on the display of the fully automatic coffee machine.

The fields 74a to 74c show the respective personalized recipes and, if applicable, also a price for each recipe. The price can be computed individually for each recipe, e.g. based on the number of ingredients used, or it can be given a price based on the respective type of beverage.

By activating the fields 74a to 74c or by activating a field 74a to 74c and an additional field—here called "MySelection" field—the beverage according to the personalized recipe can be dispensed.

The selection menu 40 (FIG. 4) can be adapted user-specific. For example, a special ingredient to be used in the fully automatic coffee machine for preparing the specified recipe, but which is not available, can be deactivated and/or the field turned gray, so that the user can see that a selection of a specific recipe is not possible.

The selection menu 40 can also comprise additional ingredients for several types of hot beverages, for example one or several flavor additives such as almond, vanilla or nut aromas.

Preparation parameters that can be changed can additionally be stored individually on the selection menu, such as the amount of water supplied, the temperature and/or the pressure.

Further preparation parameters can involve the degree and duration of the foaming of the milk foam and/or the type of flavor additive.

When establishing the communication link, the fully automatic coffee machine can also transmit an identification signal, so that the mobile device transmits the data in a manner adapted to the respective display of the fully automatic coffee machine. The display of the user profile can thus be varied depending on the display size of the fully automatic coffee machine.

The menu template can comprise a selection of beverage names for selecting the hot beverages on the fully automatic coffee machine, wherein the menu template may be adapted to the display 4 of the fully automatic coffee machine. The menu template can be adapted on the mobile device 1 via a detection signal, to match the respective display of the specific machine.

In this way, the hot beverages can also have restaurant-specific names which may differ from those specified by the manufacturer.

The respective name of the hot beverage can be provided with an identification code ID. When selecting the respective hot beverage on the menu template, data relating to the identification code ID can be transmitted to the mobile device.

With the aid of the identification code ID, the preset business-specific or user-specific composition of the selected hot beverage is then called up by the mobile device.

Alternative to transmitting a menu templet with ID code, the complete recipe for all personalized beverages can also be transmitted to the fully automatic coffee machine and can be stored there temporarily.

Thus, the user is not expected to operate complex selection menus on the fully automatic coffee machine. The final selection and triggering of the preparation occur as before by the user on the fully automatic coffee machine 1, either by the user or a server. However, the mobile device 2 contains the personalized preparation recipes, which can be stored there or can be downloaded from the Internet or a cloud application.

The fully automatic coffee machine can also be operated without a mobile device 2, using the basic menu 50. However, if a communication link is established with a corresponding mobile device 2, the functionality of the fully automatic coffee machine can be expanded further and user-specific and/or business-specific preparation recipes in a personalized selection menu 70 can be used, without this requiring a separate overwriting of the data on the fully automatic coffee machine.

In this way, even the latest changes to coffee products or newly created products can be implemented via a company-internal Internet page and/or can be overwritten on mobile devices 2, without this requiring software updates for the fully automatic coffee machine 1.

The menu datasets are preferably stored in the form of a so-called App on a smartphone or on a tablet.

A so-called BLE (Bluetooth Low Energy) communication link is preferably used for the data transmission between the fully automatic coffee machine 1 and the mobile device 2. This type of data transmission is supported without restrictions by all manufacturers for all types of cell phones and/or smartphones, for example iOS and Android.

The BLE communication range is generally restricted to 10 m, similar to that of Bluetooth 2.0. As soon as a fully automatic coffee machine 1 is within this range to the smartphone, it connects to the smartphone. The identification signal is already transmitted along when using this type of connection. Since the amounts of data transmitted via Bluetooth should be very low, the respective recipes remain on the mobile device. A special recipe is transmitted individually to the fully automatic coffee machine only following the selection of this recipe.

A near field communication (NFC) can also be used for the data transmission as an alternative to a Bluetooth connection.

According to one embodiment of the method according to the invention, information is transmitted to the manufacturer. Fully automatic coffee machines are typically not connected to the Internet.

Within the scope of a further embodiment, however, data 9 transmitted by the fully automatic coffee machine to the mobile device can also be transmitted further to the manufacturer or to third parties via the Internet. For example, the manufacturer is provided information relating to upcoming service or maintenance operations, or a supplier or central unit of a company is provided information, if applicable, that relates to an upcoming shortage of coffee and/or milk.

The personal recipes are advantageously highlighted in an additional, specially emphasized menu, wherein these are displayed in addition to the existing coffee products offered by the operator. If the user has modified a preferred coffee flavor in the App, which is not offered by the operator, a complete menu is not shown but only showing the recipes which can be prepared on the respective machine. The user can thus select advantageously only those recipes which can be prepared on the machine, e.g. the respective operator can offer and/or permit the dispensing of only those recipes.

For example, some operators my not offer coffee products prepared with milk. Or some operators may not permit that the amount of coffee used for preparing the respective coffee beverage is changed or is changed in excess of a specific amount.

The method can be utilized for a great many automatic beverage dispensers which are all of the same type and/or have the same design. However, the method preferably cannot only be used for a plurality of different beverage dispensers of the same type and/or design, but also for automatic beverage dispensers of different design and/or with different settings. The computer program in the mobile device—generally an APP—can have a specified range of settings and can contain a number of previously stored recipes which exceed the individual device types. That is not a problem since a matching between mobile device and machine takes place following the establishing of the communication link.

The amount of coffee grounds, milk etc. to be used is determined by the fully automatic coffee machine 1. The quality of the ingredients for the favored coffee flavor is therefore determined and a final price determined by the fully automatic coffee machine. This final price can be determined ahead of time when transmitting the favored recipe and can be displayed.

The fully automatic coffee machine 1 advantageously comprises sensors, for example filling level sensors, for determining the amounts and/or the volume.

With respect to user administration, several users can be registered simultaneously in the fully automatic coffee machine. Each user having a mobile device and a corresponding software and/or App is automatically connected to the fully automatic coffee machine 1. The operator, e.g. an employee of a business where the fully automatic coffee machine 1 is set up, can select the personalized recipe for the hot beverage on the fully automatic coffee machine 1. The client can provide the user in this case with the name of the selected recipe. The user can select several orders simultaneously, which are then processed by the fully automatic coffee machine. Thus, the recipes of different clients can be selected simultaneously on the control panel of the fully automatic coffee machine. Several clients can therefore be registered at the same time in the fully automatic coffee machine 1, and the operator can select and/or adjust a sequence for the dispensing.

In the case of a self-service fully automatic coffee machine 1, the user can be directed to the next free machine, wherein the recipe is transmitted to this fully automatic coffee machine. The user is given information as to which fully automatic coffee machine 1 will dispense the requested beverage. The actual brewing operation, however, is triggered on the fully automatic coffee machine 1 that is suitable and designed for preparing the beverage.

Overall, the present invention or individual preferred embodiments thereof have several advantages:

The method according to the invention is preferably used commercially and not for household use since it is particularly suitable for a very large number of users, meaning for several thousand users.

An authentication identification and/or a manual connection between the mobile device and the fully automatic coffee machine 1 is not intended and not necessary according to one preferred embodiment of the method. The communication link between the mobile device and the fully automatic coffee machine 1 is established automatically. Also, not necessary is a first initialization or connection, such as is needed for BT technologies in the automobile industry.

A general communication link can be established, independent of a specific type of fully automatic coffee machine 1, meaning the link is established with a fully automatic coffee machine 1 provided with an optional, correspondingly designed program for realizing the method. This is important particularly for professional uses since it allows a user to make use of the option of a beverage dispensed based on a personalized recipe, independent of a location or an individual machine. Slight adjustments can conceivably also be made, depending on the type and design of the fully automatic coffee machine 1, for example if an automatic coffee machine does not offer all adjustment options which are provided according to the App in the mobile device.

It is preferable if the beverage dispenser automatically detects the user.

According to one embodiment, several users can be registered simultaneously in a fully automatic coffee machine 1, which is of advantage in a restaurant or a cafeteria. Names or identifications for the individual client are in that case preferably displayed on the machine, so that the actual service personnel can start the preparation for the individual user. The communication link can insofar be personalized, meaning it can be assigned to an App defined by the operator, so that the personalized access to a fully automatic coffee machine 1 can be controlled by the operator. This is particularly advantageous for chain businesses, meaning several businesses belonging to a single enterprise or group of enterprises.

With multi-user applications, each individual user preferably can select and has available his/her own products and/or personalized recipes.

The detection range and/or distance between the fully automatic coffee machine 1 and the mobile device can be scaled to adapt it to the respective spatial conditions.

According to a different embodiment, the communication link can be configured in different ways, for example relating to payment with individual calculation, and/or based on special product features and/or characteristics of the respectively personalized recipes.

Furthermore, conceivable is the defining of different access levels with this method. Thus, the beverage dispenser can be operated only by employees or it can be designed for payment by external parties, e.g. clients in a restaurant or a business.

The beverage dispenser advantageously displays the personalized recipes of the user actively on the control panel, for example in the form of a greeting.

The mobile device need only be carried along, e.g. in a pocket. The user does not have to execute any actions/activities on the mobile device.

It will be understood that the above description of the present invention is susceptible to various modifications, changes and adaptations, and that the same are intended to be comprehended within the meaning and range of equivalents of the appended claims.

What is claimed is:

1. A method for operating a single automatic beverage dispenser, from among a plurality of automatic beverage dispensers, that dispense at least one of hot and cold beverage, by using a mobile device also having a corresponding communication unit, each of the automatic beverage dispensers having respectively one control panel and respectively one communication unit for operation, wherein each of the automatic beverage dispensers is adapted to establish communication links with a plurality of mobile devices, the method comprising steps of:

a) making available a respective dataset including at least one recipe personalized for a respective user for at least one of hot and cold beverages on the respective mobile device;

b) automatically establishing a communication link between the single automatic beverage dispenser and one of the mobile devices when a user with the one mobile device approaches the single automatic beverage dispenser;

c) transmitting the dataset for the at least one user personalized recipe for the at least one hot and cold beverage from the one mobile device to the single automatic beverage dispenser;

d) temporarily storing the dataset in a data store belonging to the single automatic beverage dispenser;

e) displaying the at least one user personalized recipe as at least one selection option, respectively, on the control panel of the single automatic beverage dispenser, wherein the displaying includes displaying only those recipes and/or activating only those recipes which can also be prepared in the single automatic beverage dispenser;

f) triggering a preparation sequence on the single automatic beverage dispenser of the hot or cold beverage by selecting one of the user personalized recipes on the control panel;

g) preparing and dispensing a personalized beverage from the single automatic beverage dispenser based on the selected one of the user personalized recipes; and h) deleting or overwriting the temporarily stored dataset from the data store of the single automatic beverage dispenser following a severing the communication link between the single automatic beverage dispenser and the one mobile device.

2. The method according to claim 1, wherein the deleting or overwriting step follows at least one of the steps f) and g).

3. The method according to claim 1, wherein the step b) comprises using one of a near-range communication link and a Bluetooth connection for automatically establishing the communication link between the single automatic beverage dispenser and one of the mobile device.

4. The method according to claim 1, wherein the temporarily storing step includes automatically storing the dataset in the data store of the single automatic beverage dispenser.

5. The method according to claim 1, wherein the step a) includes specifying on the respective mobile device a selection menu for selecting a beverage type and, following a selection of the beverage type, releasing a setup menu on the respective mobile device containing selectable details for a recipe, and then selecting by the user at least one of the selectable details to create and make available the user personalized recipe.

6. The method according to claim 5, wherein the specifying step includes specifying a selection menu containing at least one of the following beverage types: cappuccino, espresso, latte macchiato, coffee, and mocha.

7. The method according to claim 5, wherein after creating the personalized recipe by the selecting step, storing the personalized recipe on the respective mobile device through manual activation of a storage action by triggering a field on the selection menu of the mobile device.

8. The method according to claim 5, wherein the step of releasing a setup menu includes releasing a setup menu including at least the following selectable details:
a volume for the water and/or milk, and/or the milk foam,
a value for the weighed amount of coffee grounds,
a brewing temperature,
a degree of grinding fineness,
a ratio of milk foam to coffee for a coffee/milk mixed beverage,
a foam quality,
a temperature of at least one of milk and a milk foam,
a temperature of dispensed hot water, and
preparation parameters for coffee production, including pressure.

9. The method according to claim 1, wherein the displaying step e) comprises displaying a selection field on the control panel of the single automatic beverage following establishment of the communication link between the single automatic beverage dispenser and one of the mobile device; and displaying the at least one user personalized recipe as a result of a manual activation of the selection field by the user.

10. The method according to claim 1, wherein following establishment of a communication link to a plurality of the mobile devices, the displaying step e) comprises displaying a plurality of user personalized selection fields on the control panel of the single beverage dispenser, and further including manually activating one of the selection fields by one of the users to dispense a user personalized beverage brewed according to the personalized recipe stored on the mobile device of the one user.

11. The method according to claim 1, wherein the step c) further comprises transmitting a dataset relating to a user credit to the single automatic beverage machine in addition to transmitting the dataset for the user personalized recipe.

12. The method according to claim 1, further comprising receiving data at the mobile device from the single automatic beverage dispenser and then transmitting the data by the mobile device via an Internet connection to a manufacturer of the fully automatic beverage dispenser, the supplier of ingredients for the beverage, and/or the owner of the beverage dispenser.

13. The method according to claim 1, further comprising transmitting a dataset from the single automatic beverage dispenser to one of the mobile devices for an identification of the single automatic beverage dispenser from among the plurality of automatic beverage dispensers.

14. The method according to claim 1, further comprising at least one of A) indicating a location signal of the single automatic beverage dispenser and B) transmitting a location signal of the single automatic beverage dispenser to one of the mobile devices to identify the single automatic beverage dispenser from among the plurality of automatic beverage dispensers.

15. The method according to claim 1, wherein the plurality of automatic beverage dispensers are of the same design.

16. The method according to claim 1, wherein the plurality of the automatic beverage dispensers are of a different design and/or have different settings.

* * * * *